May 31, 1960 B. A. HARRIS 2,938,960

ALTERNATE ROUTING IN A STEP-BY-STEP TELEPHONE SYSTEM

Filed July 24, 1957 8 Sheets-Sheet 1

INVENTOR.
BEN A. HARRIS
BY F. H. Henson
AGENT

ALTERNATE ROUTING IN A STEP-BY-STEP TELEPHONE SYSTEM

Filed July 24, 1957

May 31, 1960 B. A. HARRIS 2,938,960

ALTERNATE ROUTING IN A STEP-BY-STEP TELEPHONE SYSTEM

Filed July 24, 1957 8 Sheets-Sheet 3

May 31, 1960 B. A. HARRIS 2,938,960

ALTERNATE ROUTING IN A STEP-BY-STEP TELEPHONE SYSTEM

Filed July 24, 1957 8 Sheets-Sheet 5

May 31, 1960 B. A. HARRIS 2,938,960

ALTERNATE ROUTING IN A STEP-BY-STEP TELEPHONE SYSTEM

Filed July 24, 1957 8 Sheets-Sheet 7

2,938,960
Patented May 31, 1960

2,938,960

ALTERNATE ROUTING IN A STEP-BY-STEP TELEPHONE SYSTEM

Ben A. Harris, Rochester, N.Y., assignor to General Dynamics Corporation, Rochester, N.Y., a corporation of Delaware Filed July 24, 1957, Ser. No. 673,819

11 Claims. (Cl. 179—18)

This invention relates in general to automatic telephone systems and, more particularly, to the alternate routing of interoffice calls in a step-by-step telephone system.

It is not economical to provide a group of direct trunk lines of sufficient number to handle peak traffic between widely separated offices in a telephone system network. It is desirable to limit the number of direct trunks between these offices to the maximum required for handling normal traffic between such offices and to re-route the overflow traffic to a tandem office where it may be directly routed to the desired office. Conventionally, alternate routing is provided only in telephone systems of the director type wherein translating register senders are employed for routing calls. In some systems applications, the use of this relatively expensive and complex equipment is not justified.

It is, therefore, the general object of this invention to provide a new and improved telephone system comprising a minimum of equipment for providing alternate routing of interoffice calls.

It is a more particular object of this invention to provide new and improved telephone equipment for automatically extending a connection from a first office through a tandem office to a distant office when all of the direct trunk lines between the first and distant offices are busy.

In accordance with the present invention, the individual trunk circuits of a first group of trunk circuits associated with direct trunk lines extending between first and second offices are terminated in first choice levels and the individual trunk circuits of a second group of trunk circuits associated with trunk lines extending between the first office and a tandem office are terminated in second choice levels of a plurality of two-motion step-by-step trunk selectors in the first office. A sender common to all of the trunk selectors is also provided in the first office for cyclically generating the impulses of the predetermined number of digits required to route a call through the tandem office to the second office. When a call is extended to one of the trunk selectors, that selector automatically searches for a level of trunk circuits having at least one idle trunk circuit therein and then automatically searches for an idle trunk circuit in that level. If a trunk circuit associated with a direct trunk line is selected, the trunk selector completes a connection between the calling line or operator's position controlling that selector and the trunk circuit selected by that selector. However, if all of the direct trunk lines are busy and the trunk selector therefore selects one of the trunk circuits associated with a trunk line extending to the tandem office, a connection is not completed between the calling line and the selected trunk line until the impulses of the digit or digits required to route the call through the tandem office have been transmitted over the selected trunk line by the sender. Gating is provided between the trunk selectors and the sender so that only a complete cycle of digit impulses can be sent over the trunk lines. That is, at the beginning of each cycle of operation of the sender, the sender seizes all of the trunk selectors which have selected trunk lines in the second group during a prior cycle of operation of the sender and the complete cycle of impulses is then repeated by each of the seized trunk selectors to its selected trunk circuit.

An important feature of the invention is that stop dial supervision is returned to the calling line or operator's position controlling each trunk selector until that trunk selector completes a connection between the calling line or operator's position and the selected trunk circuit. The trunk selectors are also arranged so as to prevent the seizure of the trunk selector by the sender if the outgoing trunk circuit associated with the trunk line selected by the trunk selector is returning stop dial supervision.

Further objects and advantages of the invention will become apparent as the following description proceeds, and features of novelty which characterize the invention will be pointed out in particularity in the claims annexed to and forming a part of this specification.

For a better understanding of the invention, reference may be had to the accompanying drawings which comprise nine figures on eight sheets.

Figures 1, 9:
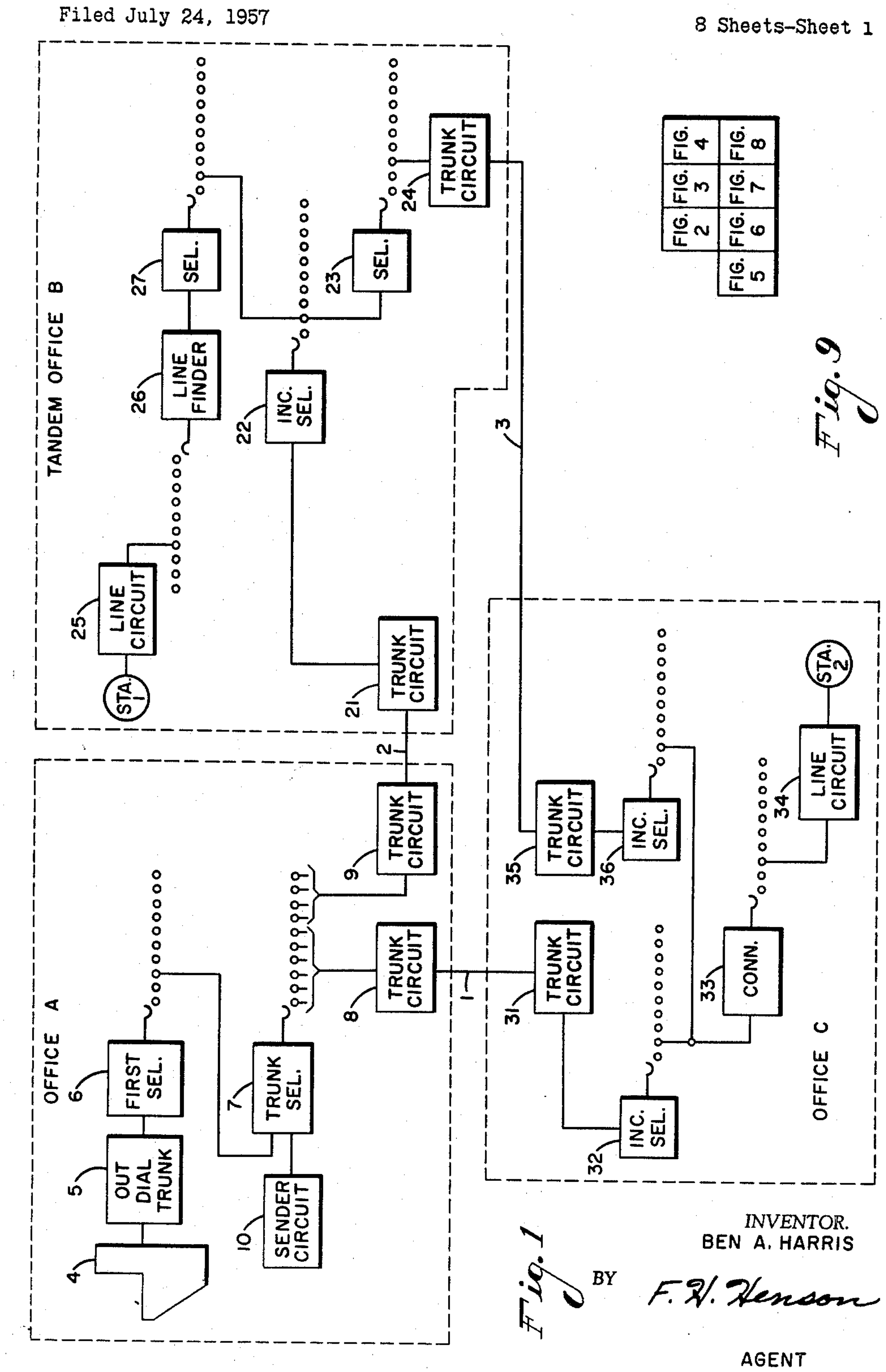
Fig. 1 shows a trunking diagram of a telephone system.
Fig. 9 shows the recommended arrangement of Figs. 2–8, inclusive, to show the invention.

The general operation of the system can best be understood by reference to the trunking diagram of Fig. 1. As shown, the system comprises office A, tandem office B, and office C. Direct trunk line 1 interconnects offices A and C, trunk line 2 interconnects office A and tandem office B, and trunk line 3 interconnects offices B and C. Calls for toll board 4 in office A to a subscriber in office C, or to a subscriber in an office reached through office C, are extended from toll board 4 through out-dial trunk circuit 5, and the third level of operator's first selector 6 to an idle trunk selector, such as trunk selector 7. It can be seen that the outgoing trunk circuits, such as trunk circuit 8, associated with the direct trunk lines, such as 1, between offices A and C, terminate in the first six levels of bank contacts of trunk selector 7 and that the outgoing trunk circuits, such as trunk circuit 9, associated with trunk lines, such as trunk line 2, between office A and tandem office B, terminate in the last four levels of bank contacts of trunk selector 7.

When a call is extended to trunk selector 7, selector 7 automatically searches for a trunk circuit associated with an idle trunk line. If trunk circuit 8 is seized, trunk circuit 31 in office C is seized over trunk line 1 and trunk circuit 31, in turn, seizes incoming selector 32 in office C. Incoming selector 32 is then controlled by dial impulses originating at operator's position 4 to select connector 33 and connector 33 is then controlled to select line circuit 34 and ring station 2, or incoming selector 32 may be controlled to select an outgoing trunk circuit to another office, all in the well known manner. If all of the direct trunk lines to office C are busy, trunk selector 7 selects and seizes a second choice trunk circuit, such as trunk circuit 9. When trunk circuit 9 is seized, trunk circuit 21 in tandem office B is seized over trunk line 2 and trunk circuit 21, in turn, seizes incoming selector 22 in tandem office B.

As previously explained, sender circuit 10 in office A serves to cyclically generate the predetermined number of digit impulses required to automatically route calls through tandem office B to office C. In the illustrated system, sender 10 is designed to generate the impulses of the digits "2" and "3," which control incoming selector 22 in tandem office B, to select an idle second selector 23 and control selector 23 to select an idle trunk circuit 24, respectively. When trunk circuit 24 is seized, trunk circuit 35 in office C is seized over trunk line 3 and trunk circuit 35, in turn, seizes incoming selector 36. Incoming selector 36 is then controlled by dial impulses originating at operator's position 4 in office A to select a subscriber's station in office C, or a subscriber's station in another office in the exact same manner as described in conjunction with incoming selector 32.

Calls can also be extended from local subscribers in tandem office B to local subscribers in office C over trunk line 3. For example, a call from station STA1 is extended through its associated line circuit 25, through line finder 26 and first selector 27 to second selector 23 and thus to trunk circuit 24 and over trunk line 3 to office C.

In the drawings, the exchange battery is shown as plus (+) and minus (−) and in the detailed description which follows is described as ground and battery, respectively. It is to be understood that in telephone systems the positive terminal of the battery is grounded and is, therefore, referred to as ground. The negative terminal of the battery is referred to as battery.

Figure 2:
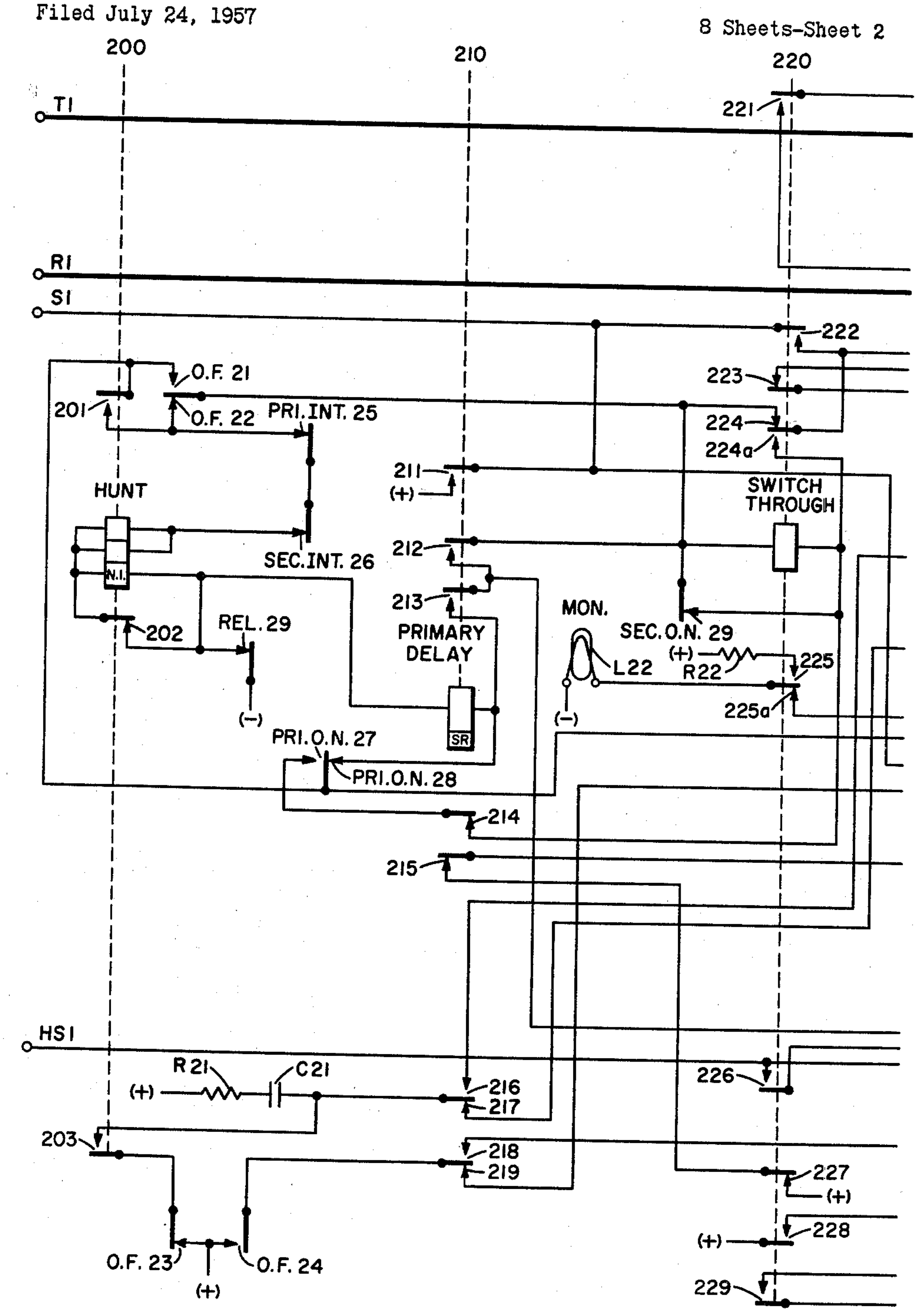
Figs. 2, 3 and 4 show a trunk selector in detail.
Figure 3:
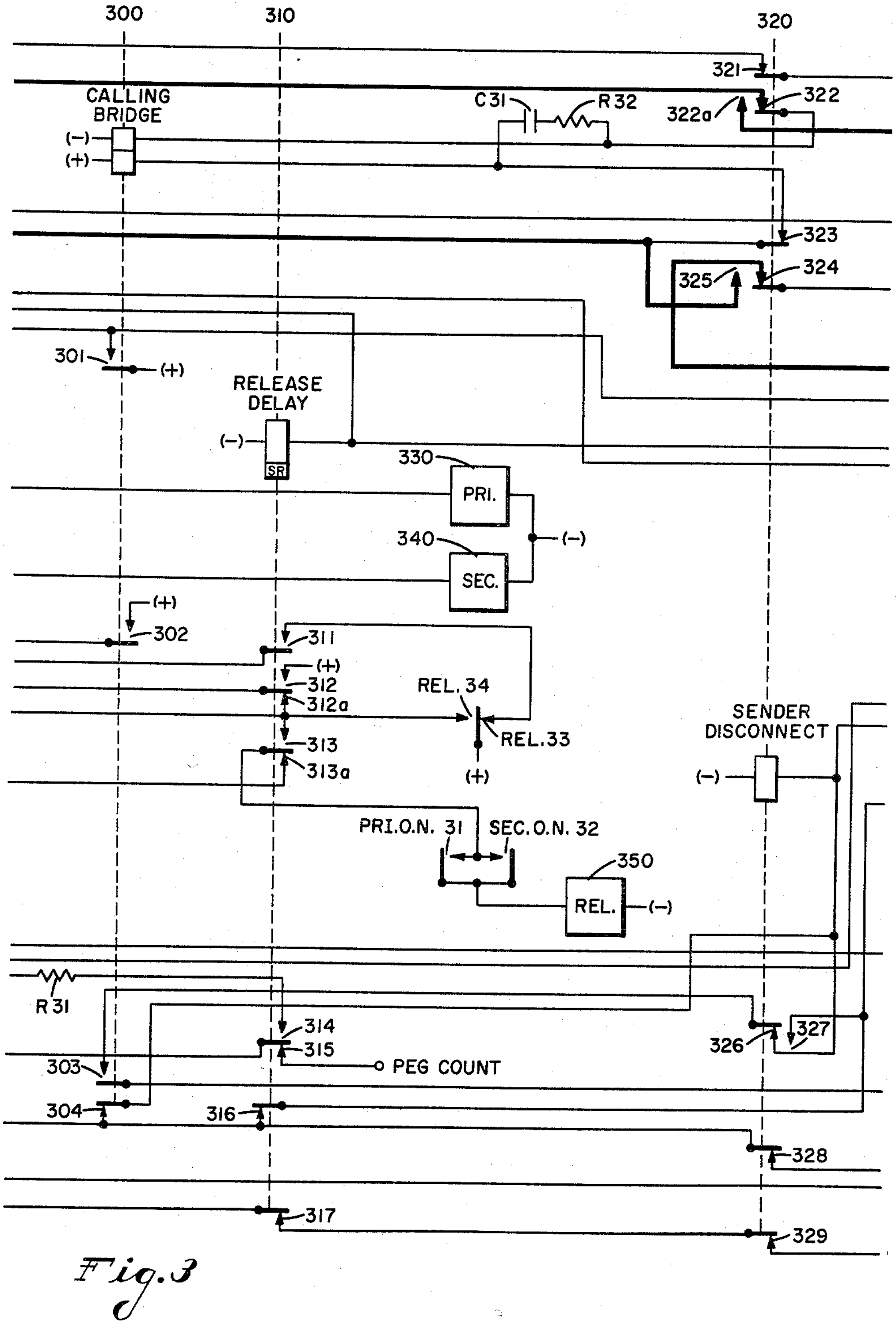
Figure 4:
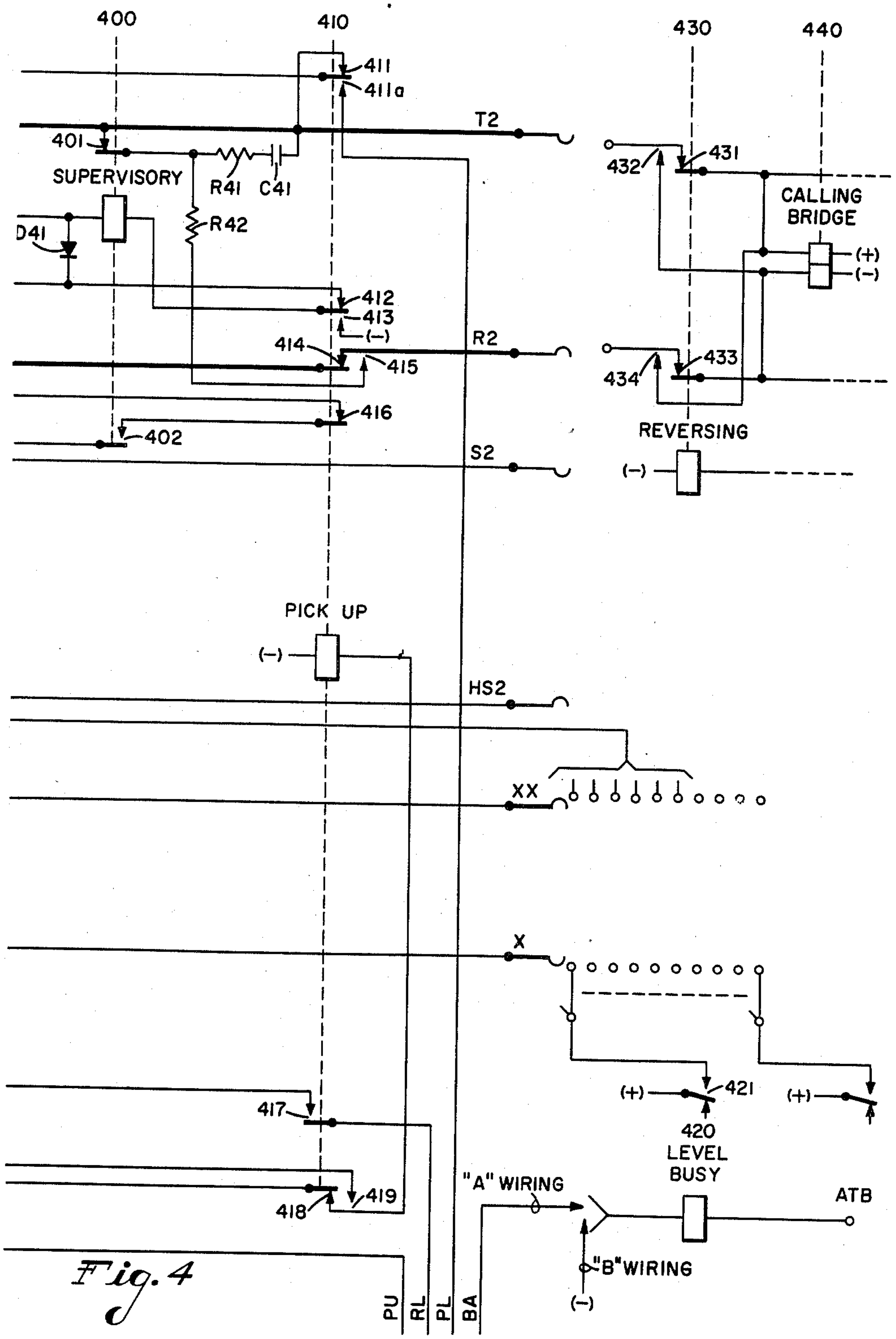
Figure 5:
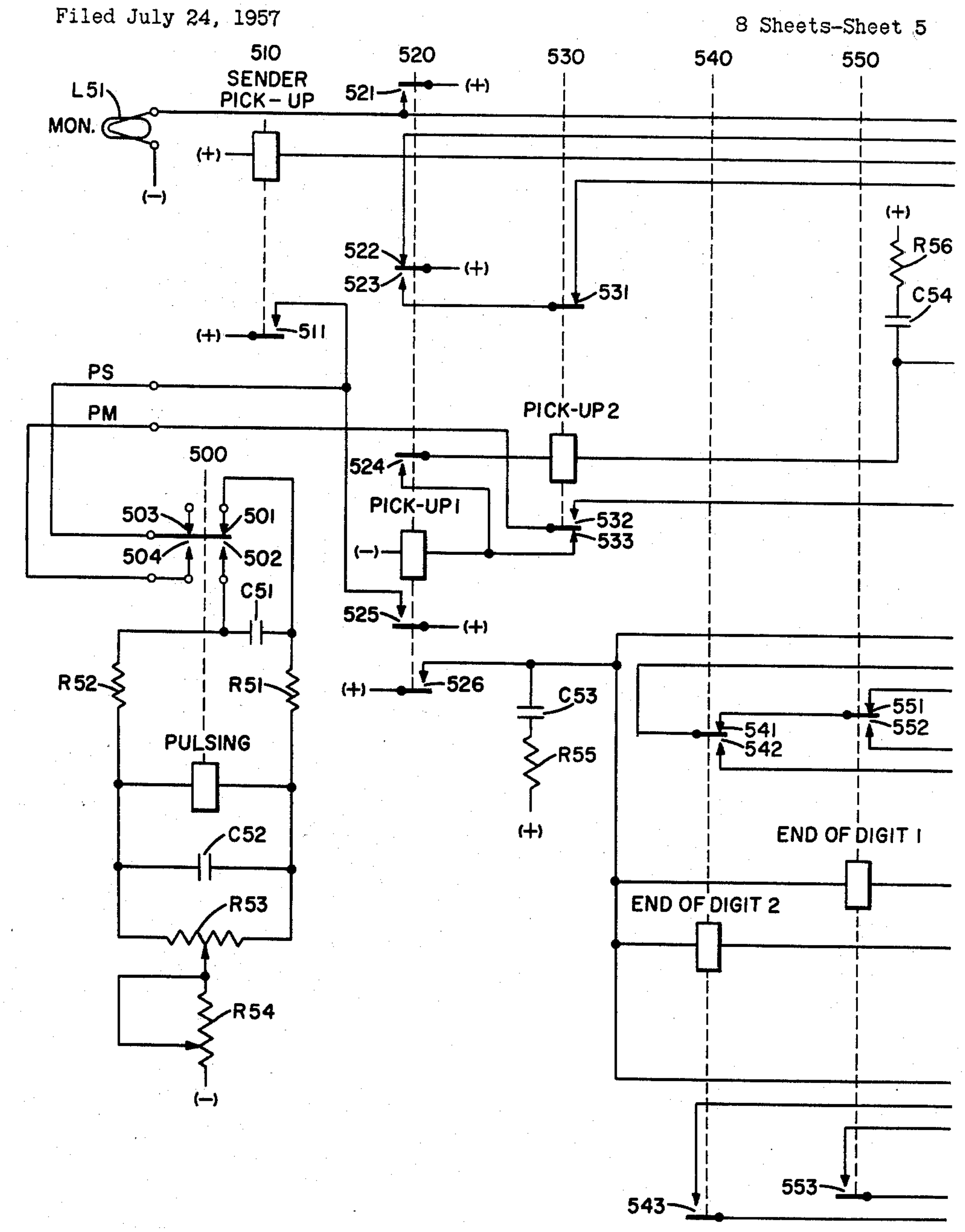
Figs. 5, 6, 7 and 8 show a sender in detail.

Trunk selector 7, which is shown in Figs. 2, 3 and 4, is seized by the closing of a loop circuit across tip and ring conductors T1 and R1 which terminate in a set of terminals in the third level of the operator's first selector 6, as shown in the trunking diagram. A loop circuit is usually completed in the out-dial trunk circuit and the loop is interrupted to transmit dial impulses either under control of a dial or a key sender circuit at the operator's position. Calling bridge relay 300 in the trunk selector operates over a circuit extending from ground through its lower winding, through break contacts 323, over conductor R1, through the loop closed in the out-dial trunk or at the operator's position, back over conductor T1, through break contacts 322, and through its upper winding to battery. It is to be noted that the potential of conductors T1 and R1 is reversed from normal as long as relay 300 is connected to conductors T1 and R1. Thus, reverse battery supervision is returned to the operator's position upon seizure of the trunk selector for the purpose of indicating a stop dial condition. This stop dial signal serves to illuminate a stop dial lamp at the operator's position if manual dialing is employed, or to stop the operation of a sender associated with the operator's position if key senders are used in the system. When relay 300 operates, monitor lamp L22 is illuminated brightly by ground through contacts 302 and 255*a* to indicate that the trunk selector has been seized. Also, the operation of relay 300 serves to close ground through contacts 301 and through break contacts 223 to the winding of release delay relay 310 and thus operate that relay. At its operated make contacts 312, relay 310 closes ground to sleeve conductor S1 to mark the trunk selector busy in the banks of the operator's first selector.

Primary delay relay 210 now operates over a circuit extending from ground on break contacts REL33, associated with release magnet 350, through contacts 311, through primary off-normal contacts PRI. ON28, through the winding of relay 210 to battery on release contacts REL29. When relay 210 operates, the selector is controlled to automatically hunt for a level of contacts having at least one idle trunk circuit therein and to then select an idle trunk circuit in that level. For the purpose of marking a level as having no idle trunk circuits therein, a level busy relay, such as relay 420, is provided for each level of trunk circuits. All trunks busy conductor ATB, which is multipled to all of the trunk circuits which terminate in the first level of bank contacts of the trunk selectors, has ground potential applied thereto as long as at least one trunk circuit of the group is idle. The other terminal of the winding of relay 420 is returned to battery either directly or over conductor BA and through break contacts K82 of the busy key in the sender circuit depending upon whether B wiring or A wiring is used, respectively. B wiring is provided for the level busy relays serving first choice trunk circuit levels and A wiring is provided for level busy relays serving second choice trunk circuit levels. When all of the trunk circuits associated with relay 420 become busy, ground is removed from conductor ATB, relay 420 releases, and at contacts 421, closes ground potential to the first contact of the X-bank of each of the trunk selectors. It should be mentioned at this time that brushes X and XX move only during the primary motion of the selector switch and serve to indicate or mark the level of bank contacts selected by the main brushes on said primary motion.

When relay 210 operates, an operating circuit is completed for hunt relay 200 from ground through break contacts REL33, contacts 311, break contacts PRI. ON28, make contacts 213 and 212, overflow break contacts OF22, primary interrupter break contacts PRI. INT25, secondary interrupter break contacts SEC. INT26, and through the windings of relay 200 to battery on release break contacts REL29. The lower winding of hunt relay 200 is a non-inductive winding and is shunted by break contacts 202 on said relay. Thus, this relay is made fast operate by the shunting of the non-inductive winding when the relay is unoperated and is made fast release by the inclusion of the non-inductive winding in series with its parallel connected inductive windings when the relay is operated and contacts 202 are open. The primary magnet 330 is now operated from ground on overflow break contacts OF23 through pulsing contacts 203, contacts 216, and through its winding to battery. Capacitor C21 and resistor R21 form a spark protection network for pulsing contacts 203. In response to the operation of magnet 330, the brushes T2, R2, S2 and HS2 are stepped one step in the primary direction, and auxiliary brushes X and XX are stepped to engage the first contact of their respective banks. Also in response to the operation of primary magnet 330, primary interrupter contacts PRI. INT25, associated with the primary magnet, open to release hunt relay 200 and thus deenergize primary magnet 330. Primary off-normal contacts PRI. ON28 open during the first step of the switch to open the original energizing circuit for relay 210. If all trunk circuits in the first level are busy, ground on the X brush, supplied through contacts 421, is applied through contacts 212, contacts OF22, contacts PRI. INT25, contacts SEC. INT26, to the windings of hunt relay 200 to reoperate relay 200 and thus reoperate primary magnet 330 and step the brushes to the second level of contacts. The ground on the X brush is also coupled through contacts 213 to hold the slow release primary delay relay 210 operated. If all of the trunk circuits in all of the levels of the selector banks are busy, hunt relay 200 and primary magnet 330 continue to operate until the switch brushes reach the overflow position in the primary direction. Primary delay relay 210 remains operated through this complete operation since the ground appearing on brush X is also applied through contacts 213 to the winding of relay 210. When the switch brushes reach the overflow position as marked by the operation of overflow contacts OF24, ground is applied through contacts 218 and 314, and through resistor R31 to conductor HS1 for the purpose of marking the all trunks busy condition to preceding circuits. Relay 210 is held operated when the switch brushes reach the overflow position from ground on contacts REL33 through contacts 311, contacts OF21, and through contacts 212 and 213.

Next assume that there is an idle trunk circuit in the second level of bank contacts. Since there is no ground connected to the X brush, primary delay relay releases after a short interval to complete an operating circuit for hunt relay 200 from ground on contacts REL33, through contacts 311, contacts PRI. ON27, which operate on the first step of the switch brushes in the primary direction, through break contacts 214 on now released relay 210, through contacts SEC. ON29, contacts OF22, contacts PRI. INT25, and through contacts SEC. INT26. Relay 200 in operating at this time, closes an operating ground to secondary magnet 340 through contacts OF23, its pulsing contacts 203, break contacts 217 on now released relay 210, and through the windings of magnet 340 to battery. Secondary magnet 340 in operating serves to move brushes T2, R2, S2 and HS2 one step in the secondary direction and also serves to open contacts SEC. INT26 to release hunt relay 200. If the first trunk circuit in the selected level is busy, ground returned over sleeve brush S2 serves to operate hunt relay 200 through contacts 224 and the previously described overflow and interrupter contacts. Secondary magnet 340 is, of course, reoperated to advance the brushes when relay 200 operates and the opening of the interrupter contacts SEC. INT26 serves to release relay 200 and magnet 340 when the brushes have taken a complete step. This action continues until an idle trunk circuit is found in the selected level. If all of the trunk circuits in the selected level become busy by virtue of being seized by other selectors before one of the trunk circuits is selected by the illustrated selector, the switch brushes hunt to the overflow position in the secondary direction. When the switch reaches the overflow position, as marked by the closing of overflow contacts OF24, ground potential is coupled through contacts 219, 313, and through PRI. ON31 and/or SEC. ON32 to release magnet 350 which then operates to restore the brushes to normal. When the switch brushes restore to normal, primary delay relay 210 reoperates and the switch then begins its hunting action in the primary direction.

When an idle trunk circuit is found in the selected level, as marked by the absence of ground on sleeve brush S2, switch-through relay 220 operates over a circuit extending from ground on contacts REL33, through contacts 311, contacts PRI. ON27, contacts 214, through the winding of relay 220, and through the previously described circuit to the windings of hunt relay 200 to battery. The resistance of switch-through relay 220 is sufficiently high so as to prevent the operation of hunt relay 200 in this circuit.

When switch-through relay 220 operates, a loop circuit is completed to operate the calling bridge relay 440 in the selected trunk circuit. The operating circuit for relay 440 extends from ground through its upper winding, through contacts 431, tip brush T2, contacts 411, contacts 321, contacts 221 on now operated relay 220, through the winding of supervisory relay 400, through break contacts 412, 324 and 414, over brush R2, through contacts 433, and through the lower winding of relay 440 to battery. When relay 440 of the trunk circuit operates, a delay relay in the trunk circuit operates to apply ground to brush S2 and thus mark that trunk circuit as busy in the trunk selector banks in the well known manner. The ground on brush S2 is coupled through contacts 222 to sleeve conductor S1 and is also coupled through contacts 224*a* to hold relay 220 operated after relay 310 releases as will be described more fully hereinafter. It is to be noted that diode D41 shunts the winding of supervisory relay 400 and is poled to prevent the operation of relay 400 when battery is not reversed from the selected trunk circuit. The operation of relay 220 and the resulting opening of contacts 225*a* and the closing of contacts 225 serves to remove direct ground from monitor lamp L22 and replace it with ground through resistor R22. Thus, lamp L22 is illuminated dimly to indicate that the trunk selector has seized a trunk circuit. Also, when switch-through relay 220 operates, release delay relay 310 is deenergized by the opening of break contacts 223. If stop dial supervision is returned from the selected trunk circuit during the release time of relay 310, as, for example, by the operation of reversing relay 430 in any well known manner, diode D41 is poled in the reverse direction for shunting supervisory relay 400 and relay 400 operates to close an alternate operating path for release delay relay 310. Relay 310 thus holds operated from ground, through contacts 301, 416, 402, and through its winding to battery.

When the equipment seized in the distant office in response to the seizure of the selected trunk circuit is in readiness to receive dial impulses, reversing relay 430 releases and normal battery is applied to brushes T2 and R2. When the battery potential reverts to normal, diode D41 is poled so as to shunt supervisory relay 400 and relays 400 and 310 release. Since the selected trunk circuit is assumed to be in the second level, and is thus associated with a direct trunk line to office C, sender disconnect relay 320 operates over a circuit extending from ground on contacts 228, through break contacts 316 on now released relay 310, over the XX brush, through the second terminal of the XX bank, and through the winding of relay 320 to battery. It should be obvious that sender disconnect relay 320 is operated directly under control of the XX brush only when one of the first choice trunks in the first six levels of bank contacts is selected. At its operated contacts 322*a* and 325, relay 320 completes a metallic connection from incoming tip and ring conductors T1 and R1 to tip and ring brushes T2 and R2, respectively. At break contacts 322 and 323, calling bridge relay 300 is removed from the line and at break contacts 321 and 324, supervisory relay 400 is disconnected from the brushes T2 and R2. When calling bridge relay 300 is removed from the line, the stop dialing signal, which had been returned to the operator's position, is terminated and normal battery is returned to the operator's position through the windings of relay 440. Dial impulses originating at the operator's position now control relay 440 in the selected trunk circuit which, in turn, repeats the impulses to its associated trunk line to step equipment in the distant office in the well known manner.

Next assume that all of the direct trunk lines between office A and office C are busy so that the trunk selector selects a trunk circuit which terminates in the seventh, eighth, ninth, or tenth levels of the terminal banks. As previously described, when an idle trunk circuit is selected, switch-through relay 220 operates and supervisory relay 400 holds release delay relay 310 operated until stop dial supervision is no longer received from the trunk circuit signifying that the equipment is in readiness to receive dial impulses. When supervisory relay 400 releases and release delay relay 310 therefore releases, pickup relay 410 is connected to conductor PU through contacts 418, 229, 317 and 329. Conductor PU is connected in multiple to all of the trunk selector circuits and extends to the winding of pickup relay 510 in the sender circuit. Sender pickup relay 510 operates when one or more trunk selector pickup relays, such as 410, are connected to conductor PU. The resistance of the winding of relay 510 is sufficiently high so as to prevent the operation of the trunk selector pickup relays, such as relay 410.

Responsive to the operation of sender pickup relay 510, an operating circuit is closed for pulsing relay 500. The operating circuit extends from ground on operated contacts 511, through break contacts 501, and through the winding of relay 500 to battery through resistors R53 and R54. Relay 500 constitutes a self-interrupting pulse source which runs at approximately ten pulses per second and gives an output of approximately forty percent make on contacts 504, as determined by the setting of slide-wire resistors R54 and R53, respectively. The first operation of relay 500, as indicated by the closing of contacts 504, serves to connect the ground from contacts 511 through break contacts 533 to operate pickup 1 relay 520. At contacts 525, relay 520 applies an alternate operating ground to relay 500 since relay 510 will release as soon at all of the trunk selectors ready to receive sender pulses have been seized as will be described more fully hereinafter. Ground is now applied to conductor PU through contacts 523 on operated relay 520 and through contacts 531 and 601. This ground serves to operate all pickup relays connected to the conductor PU in the various trunk selectors. For example, in the illustrated trunk selector, relay 410 operates when ground is applied to conductor PU over the previously described path and at its operated contacts 419, locks operated to ground potential on contacts 228 and through contacts 328. At its break contacts 411 and 412, relay 410 removes supervisory relay 400 from in shunt with the brushes T2 and R2 and at its operated contacts 411*a* and 413, connects the winding of relay 400 to conductor PL and to battery, respectively. A loop circuit through break contacts 401 on relay 400 is now substituted for the previously described loop circuit across brushes T2 and R2. The calling bridge relay 440 in the selected trunk circuit is now held operated over a loop circuit extending from brush T2, through contacts 401, resistor R42, and contacts 415 to ring brush R2. At its break contacts 416, relay 410 also further opens the energizing circuit for release delay relay 310 so that the subsequent pulsing of supervisory relay 400 from pulses received over conductor PL will not serve to operate relay 310. At break contacts 418, relay 410 disconnects its winding from conductor PU and as a result thereof, sender pickup relay 510 releases.

Returning to the consideration of the sender circuit, it can be seen that when pulsing relay 500 releases to mark the termination of the first pulse, pickup 2 relay 530 operates from ground through contacts 611, through its winding, through contacts 524, and through the winding of relay 520 to battery. It can be seen that prior to the release of pulsing relay 500, relay 530 was shunted with ground on both terminals of its winding and the relay thus operates only at the completion of the first pulse. At contacts 531, relay 530 removes ground from conductor PU so that any trunk selectors selecting trunk circuits in second choice levels at this time will not be able to transmit impulses during this cycle of operation of the sender but must wait until the beginning of the next cycle of operation of the sender. It should be pointed out at this time that since the system illustrated in the trunking diagram requires the sending of two digits to the tandem office, "D" wiring is used in the sender and "U" and "T" wiring are omitted. The sender is designed to send either one, two or three digits, as determined by the use of optional wiring "U," "D" and "T." respectively.

When pulsing relay 500 reoperates to reclose contacts 504, the pulsing ground is extended through contacts 532, 642, 612 and "D" wiring to conductor PL to operate all of the supervisory relays in the various trunk selectors which are connected to conductor PL. The operating circuit for the supervisory relay 400 extends from ground on conductor PL, through contacts 411*a*, 321, contacts 221, through its winding, and through contacts 413 to the battery. Thus, relay 400 operates on each pulse applied to conductor PL and at its break contacts 401, repeats these impulses to calling bridge relay 440 of the selected trunk circuit. Capacitor C41 and resistor R41 serve as a spark protection network for the pulsing contacts 401. The ground applied to conductor PL is also coupled through diode D71, through contacts 711, contacts 721, contacts 731, and through the winding of count 1 relay 840 to battery to operate relay 840. When relay 500 releases at the termination of the pulse, count A relay 730 operates over a circuit extending from ground on contacts 526, through contacts 631, contacts 723, through its winding, through contacts 842, and through the winding of relay 840 to battery. Count A relay 730 opens the original operating circuit of relay 840 at contacts 731 but relay 840 remains operated in series with relay 730. It will be noted that count A relay 730 is shunted by ground on both terminals of its winding until the termination of the first transmitted impulse and it then operates and holds in series with the operated count 1 relay 840. The next operation of pulsing relay 500 serves to operate count 2 relay 830 and at the termination of the impulse, count B relay 720 operates in the exact same manner as described for the operation of relays 840 and 730. The operation of count B relay 720 and the resulting opening of contacts 723 serves to release relays 730 and 840.

Figure 6:
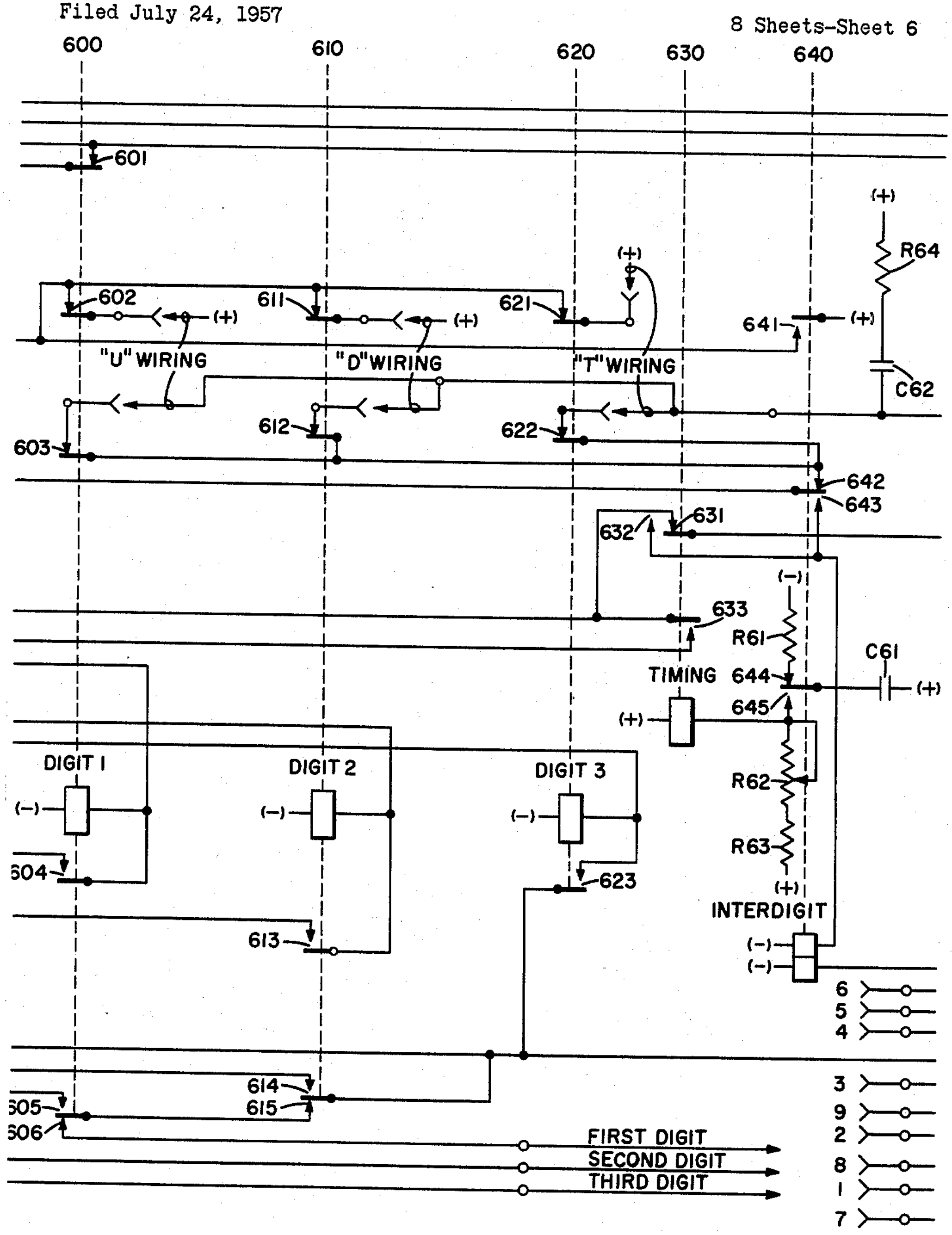
Figure 7:
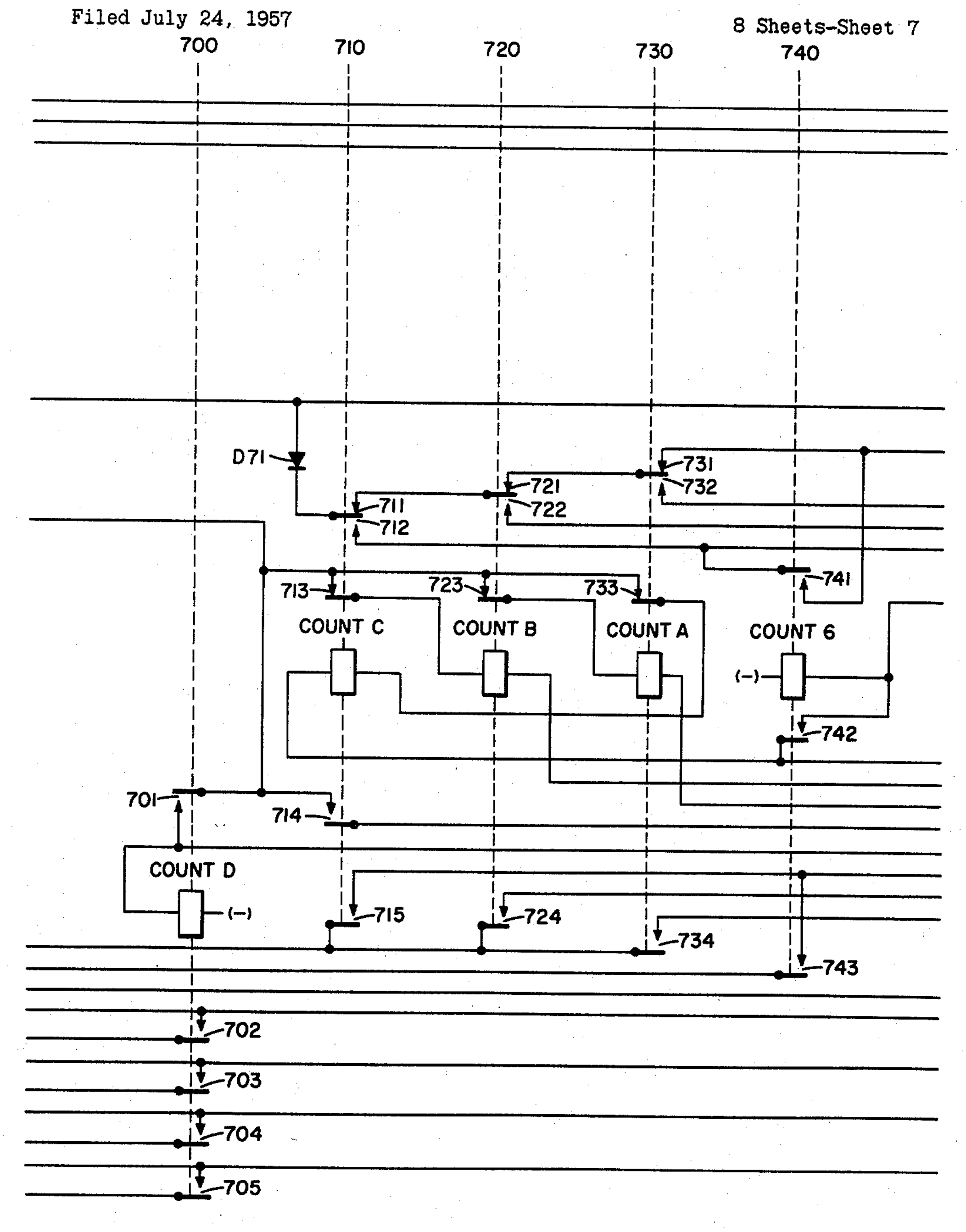

Since it was assumed that the first digit required in the tandem office is the digit "2," ground is now applied through contacts 526, contacts 615, contacts 606, conductor first digit, which is connected to the terminal marked 2 in Fig. 6, through contacts 833 and 724 to operate the interfit relay 640 on its lower winding. At contacts 642, relay 640 prevents further pulses from relay 500 from being applied to conductor PL, and at contacts 645, closes an operating circuit for timing relay 630. Timing capacitor C61 is charged to minus forty-eight volts through contacts 644 prior to the operation of relay 640 and when relay 640 operates to close contacts 645, relay 630 is operated from the charge on capacitor C61 and remains operated for the discharge time of said capacitor through its winding. At contacts 631, operated relay 630 releases the operated relays of the counting chain which, in the present example, were assumed to be relays 720 and 830. Relay 630 also completes an operating circuit for digit 1 relay 600 from ground on contacts 526, through contacts 633, contacts 541, contacts 551, and through the winding of digit 1 relay 600 to battery. Relay 640 is held operated through contacts 632 on timing relay 630 after the counting chain is released. After approximately six hundred milliseconds, as determined by the discharge time of capacitor C61, timing relay 630 releases. If pulsing relay 500 is in an operated condition at this time, relay 640 is held operated through its operated contacts 643 and thus prevents the application of a partial pulse to conductor PL. Upon the next release of relay 500, relay 640 releases and the circuit is in readiness to transmit the next pulse from relay 500 to conductor PL, as previously described. End of digit 1 relay 550 operates when timing relay 630 releases over a circuit extending from ground on contacts 526, through the winding of relay 550, through contacts 604, and through the winding of relay 600 to battery.

The first operation of pulsing relay 500 on the second digit, which is assumed to be the digit "3," is repeated to conductor PL and also serves to operate count 1 relay 840, as previously described. At the completion of the first pulse, count A relay 730 operates, as previously described. The second pulse operates count 2 relay 830 and count B relay 720 to release relays 730 and 840, and the third pulse operates count 3 relay 820 and count C relay 710 to release relays 720 and 830, all as previously described. At the completion of the third impulse, ground on contacts 526 is routed through contacts 615, contacts 605 on now operated relay 600, contacts 553 on now operated relay 550, and over conductor second digit, which is connected to terminal 3 in Fig. 6, through contacts 823 and 715 to operate the interdigit relay 640 on its lower winding. Timing relay 630 and digit 2 relay 610 operate in response to the operation of relay 640 over the circuits previously described. The opening of contacts 615 in response to the operation of relay 610 serves to release the operated relays 820 and 710 of the counting chain and relay 640 holds operated through contacts 632 of timing relay 630. At the end of the interdigit timing interval, relay 630 releases and relay 640 holds operated through its contacts 643 if pulsing relay 500 is in an operated condition. It is to be noted that since it was assumed that "D" wiring is used, the original holding ground for the pickup relays 530 and 520 was removed at contacts 611 when relay 610 operated but an alternate holding ground for these relays is supplied through contacts 641 until timing relay 640 releases. When interdigit relay 640 finally releases, relays 520 and 530 release. When relay 520 releases, the operating circuits for relays 550, 600 and 610 are opened at contacts 526 and these relays release.

Also, when relay 520 releases, ground is applied through contacts 522 to conductor RL to operate the sender disconnect relay in each trunk selector in which the present cycle of digit impulses has been repeated to its selected trunk circuit. The operating circuit for sender disconnect relay 320 is from ground on conductor RL, through contacts 417, contacts 303, contacts 326, and through the winding of relay 320 to battery. At contacts 327, relay 320 locks operated to ground through contacts 228 and 316. The operation of relay 320 serves to release relay 410 on the opening of contacts 328 and relay 400 is disconnected from conductor PL at contacts 321 and at contacts **411*a*. The calling line is now cut through to the selected trunk circuit at contacts 322*a* and 325 and calling bridge relay 300 is disconnected from conductors T1 and R1 by contacts 322 and 323, all as previously described. The calling bridge relay 400** in the selected trunk circuit is now controlled by dial pulses from the operator's position and serves to repeat these dial impulses to the switching equipment in the distant office.

Returning to the consideration of the sender, it can be seen that if other trunk selectors have selected second choice trunk circuits during the just described cycle of operation of the sender, sender pickup relay 510 reoperates and upon the next operation of pulsing relay 500, pickup 1 relay 520 operates to initiate another cycle of operation of the sender. If no trunk selectors are waiting to receive routing impulses, relay 510 is released and relay 500 terminates its self-interrupt operation when relay 520 releases.

The release of the trunk selector is the same regardless of whether the selected trunk circuit terminates in first or second choice levels of the terminal banks. When the calling party hangs up, calling bridge relay 440 in the selected trunk circuit releases and ground is removed from sleeve conductor brush S2 in the well known manner to release switch-through relay 220. The opening of contacts 228 serves to release relay 320 and the closing of contacts 227 completes an operating circuit for the release magnet 350 over a circuit extending from ground on contacts 227, through contacts 215, contacts **313*a*, contacts PRI. ON31 and/or SEC. ON32, and through the winding of the release magnet 350 to battery. When release magnet 350** operates, the switch brushes are restored to normal.

Figure 8:
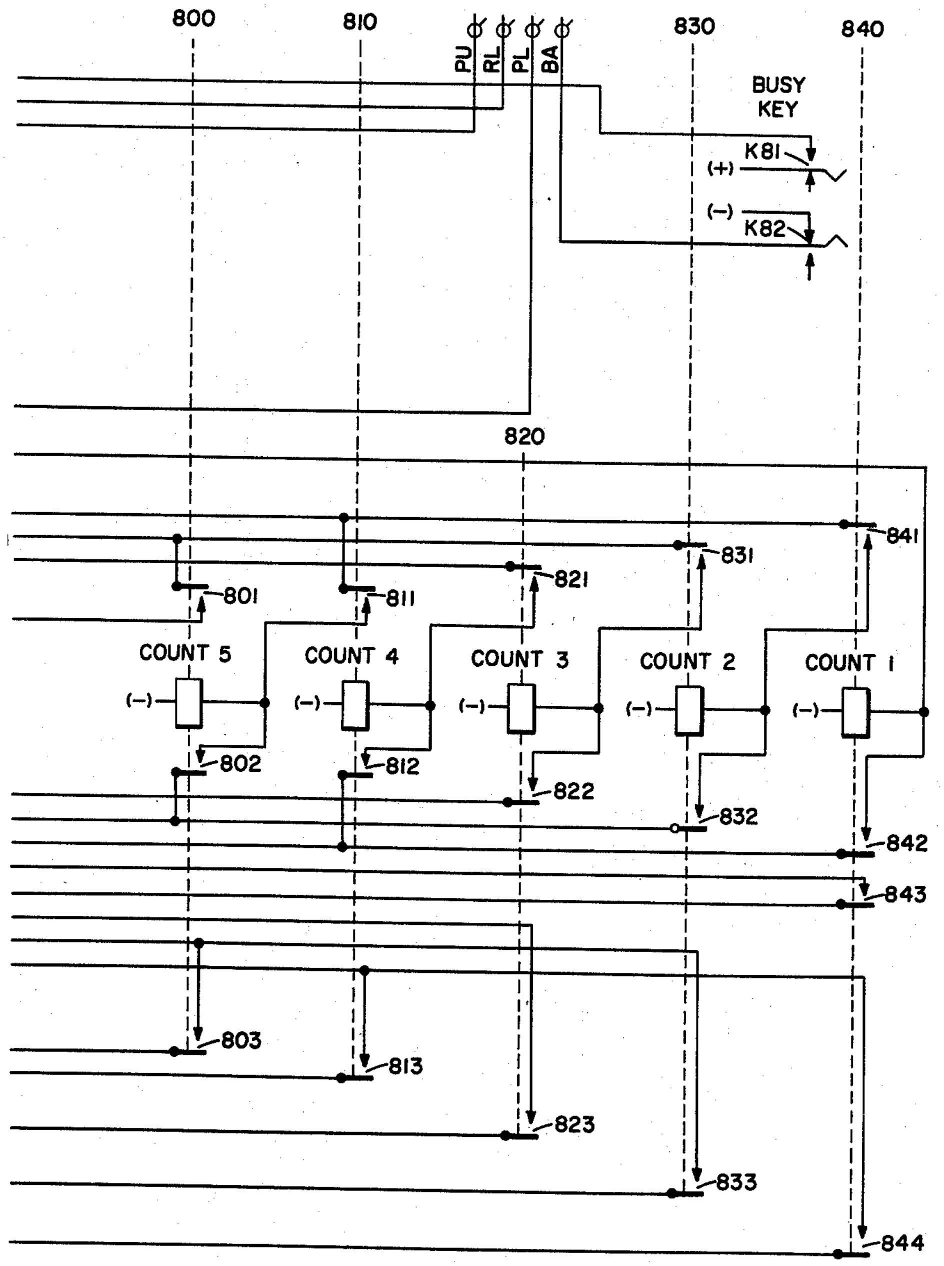

The sender may be removed from service by the operation of the busy key, shown in Fig. 8. The closure of busy key contacts K81 serves to illuminate the monitor lamp L51 and the opening of busy key contacts K82 serves to remove battery from conductor BA and thus from the terminals of the level busy relays corresponding to the second choice levels. When the level busy relays release, ground is applied to the X terminals corresponding to those levels and those levels are therefore marked as busy to the trunk selectors.

The operation of the sender has been described for the sending of the digits "2" and "3." When it is necessary to send a routing digit greater than the digit "6," the opertion of the sender counting chain is modified somewhat in that count D relay 700 operates so that the first through third digit counting relays may be reused for counting the seventh through ninth digit impulses, respectively. For example, count 1 relay 840 operates on the seventh impulse through contacts 712 and 741 and count D relay 700 then operates through contacts 714 and 843. At the termination of the seventh impulse, count A relay 730 operates in series with relay 840, as previously described. It can be seen that the digit "7" terminal is now connected through contacts 705, 844 and 734 to the lower winding of interdigit relay 640. Similarly, relays 830 and 720 register the eight digit impulse and relays 820 and 710 register the ninth digit impulse.

While there has been shown and described what is at present considered to be the preferred embodiment of the invention, modifications thereto will readily occur to those skilled in the art. It is not desired, therefore, that the invention be limited to the embodiment shown and described, and it is intended to cover in the appended claims all such modifications as fall within the true scope and spirit of the invention.

What is claimed is:

1. In a telephone system, a plurality of trunk selectors having access to a group of trunk lines, a sender common to said selectors for cyclically generating the impulses of one or more predetermined digits, means for extending individual connections from calling lines of said system to said trunk selectors, means responsive to the extension of a connection to any one of said selectors for causing that selector to select an idle trunk line, and means including said sender for transmitting one cycle of said impulses over the trunk lines which have been selected prior to the beginning of each cycle of operation of said sender.

2. In a telephone system, a plurality of trunk selectors each comprising a set of brushes and a terminal bank divided into a plurality of levels, first and second groups of trunk lines, means for terminating said first group of trunk lines in first choice levels of said selector banks, means for terminating said second group of trunk lines in second choice levels of said selector banks, means for extending individual connections to said selectors, means in each selector responsive to the extension of a connection thereto for controlling said brushes to first select a level having at least one idle trunk line therein and to then select an idle trunk line in said level, a sender common to said selectors for cyclically generating the impulses of one or more predetermined digits, and means including said sender for transmitting one cycle of said impulses over trunk lines terminated in said second choice levels which have been selected prior to the beginning of each cycle of operation of said sender.

3. In a telephone system, a plurality of trunk selectors each comprising a set of brushes and a terminal bank divided into a plurality of levels, first and second groups of trunk lines, means for terminating said first group of trunk lines in first choice levels of said selector banks, means for terminating said second group of trunk lines in second choice levels of said selector banks, means for extending individual connections from calling lines of said system to said trunk selectors, means in each selector responsive to the extension of a connection thereto for controlling said brushes to first select a level having at least one idle trunk line therein and to then select an idle trunk line in that level, means in each selector responsive to the selection of an idle trunk line in one of said first choice levels by its brushes for completing a connection between the calling line controlling said selector and the selected trunk line, a sender common to said selectors for cyclically generating the impulses of one or more predetermined digits, means including said sender for transmitting one cycle of said impulses over trunk lines terminated in said second choice levels which have been selected prior to the beginning of each cycle of operation of said sender, and means in each selector responsive to the completion of the transmittal of said impulses over its selected trunk line for completing a connection between the calling line controlling said selector and the selected trunk line.

4. In a telephone system, a first office, a second office, a tandem office, a first group of trunk lines extending from said first office to said second office, a second group of trunk lines extending from said first office to said tandem office, a third group of trunk lines extending from said tandem office to said second office, a plurality of trunk selectors in said first office, a sender common to said selectors for cyclically generating the impulses of one or more predetermined digits, means for extending individual connections to said selectors, means responsive to the extension of a connection to any one of said selectors for causing said selector to select a trunk line of said first group of trunk lines if a trunk line of said first group is idle and to select an idle trunk line of said second group only if all of the trunk lines of said first group are busy, means including said sender for transmitting one cycle of said impulses over trunk lines of said second group which have been selected prior to the beginning of each cycle of operation of said sender, and means in said tandem office responsive to the receipt of said impulses over any one trunk line of said second group for completing a connection between that trunk line and an idle trunk line of said third group.

5. In a telephone system, a first office, a second office, a tandem office, a first group of trunk lines extending from said first office to said second office, a second group of trunk lines extending from said first office to said tandem office, a plurality of trunk selectors in said first office, each of said trunk selectors comprising a set of brushes and a terminal bank divided into a plurality of levels, means for terminating said first group of trunk lines in first choice levels of said selector banks, means for terminating said second group of trunk lines in second choice levels of said selector banks, means for extending individual connections to said selectors, means in each selector responsive to the extension of a connection thereto for controlling its brushes to first select a level having at least one idle trunk line therein and to then select an idle trunk line in the selected level, a sender common to said selectors for cyclically generating the impulses of one or more predetermined digits, means including said sender for transmitting one cycle of said impulses over trunk lines terminated in second choice levels which have been selected prior to the beginning of each cycle of operation of said sender, and means in said tandem office responsive to the receipt of said impulses over a trunk line of said second group for routing a connection from that trunk line to the second office.

6. In a telephone system, first and second offices interconnected by a plurality of trunk lines, a plurality of lines in said first office, a plurality of trunk selectors in said first office each having access to said plurality of trunk lines, a sender common to said selectors for cyclically generating the impulses of one or more predetermined digits, means for extending individual connections from calling ones of said lines to said trunk selectors, means in each selector for transmitting stop dial supervision to its controlling calling line when a connection is extended thereto, means in each selector responsive to the extension of a connection thereto for selecting an idle one of said plurality of trunk lines, means including said sender for transmitting one cycle of said impulses over trunk lines which have been selected prior to the beginning of each cycle of operation of said sender, and means in each selector responsive to the completion of the transmission of said impulses over its selected trunk line for terminating the transmission of stop dial supervision to its controlling calling line.

7. In a telephone system, first and second offices, a plurality of outgoing trunk circuits in said first office for extending connections to said second office, an operator's position in said first office, a trunk selector in said first office having access to said trunk circuits, a sender in said first office for cyclically generating the impulses of one or more predetermined digits, means for extending a connection from said operator's position to said trunk selector, means in said selector for transmitting stop dial supervision to said operator's position when a connection is extended thereto, means in said selector responsive to the extension of a connection thereto for selecting an idle one of said trunk circuits, means in each trunk circuit for at times transmitting stop dial supervision to said selector, means including said sender for transmitting one cycle of said impulses to said selected one trunk circuit only when stop dial supervision is not being transmitted from said one trunk circuit to said selector, and means in said selector responsive to the completion of the transmission of said impulses to said one trunk circuit for terminating the transmission of stop dial supervision to said operator's position.

8. In a telephone system, first and second offices, a plurality of outgoing trunk circuits in said first office for extending connections to said second office, a plurality of operator positions in said first office, a plurality of trunk selectors in said first office each having access to said plurality of trunk circuits, a sender common to said selectors for cyclically generating the impulses of one or more predetermined digits, means for extending individual connections from calling ones of said positions to said selectors, means in each selector for transmitting stop dial supervision to its controlling operator position when a connection is extended thereto, means in each selector responsive to the extension of a connection thereto for selecting an idle one of said trunk circuits, means in each trunk circuit for at times transmitting stop dial supervision to the selector which selected that trunk circuit, means including said sender for transmitting one cycle of said impulses to trunk circuits which have been selected prior to the beginning of each cycle of operation of said sender and which are not transmitting stop dial supervision to the selectors which selected those trunk circuits, and means in each selector responsive to the completion of the transmission of said impulses to its selected trunk circuit for terminating the transmission of stop dial supervision to its controlling operator position.

9. In a telephone system, a plurality of trunk selectors having access to a group of trunk lines, means for extending individual connections from calling lines of said system to said trunk selectors, means responsive to the extension of a connection to any one of said selectors for causing that selector to select an idle trunk line, a sender common to said selectors and operative through a given cycle to generate the impulses of one or more predetermined routing digits, means for transmitting said impulses over trunk lines selected by said selectors during a prior cycle of operation of said sender, means for accumulating trunk lines selected during said given cycle of operation of said sender for receiving said impulses during a subsequent cycle of operation of said sender, means controlled by the presence of accumulated trunk lines for initiating operation of said sender, and means controlled when all accumulated trunk lines have received said impulses for arresting operation of said sender.

10. In a telephone system, a plurality of trunk selectors having access to a group of trunk lines, a plurality of operator positions, means for extending individual connections from calling operator positions to said selectors, means responsive to the extension of a connection to any one of said selectors for causing that selector to select an idle trunk line, a sender common to said selectors and operative through a given cycle to generate the impulses of one or more predetermined digits, means for transmitting said impulses over trunk lines selected by said selectors during a prior cycle of operation of said sender, means for accumulating trunk lines selected during said given cycle of operation of said sender for receiving said impulses during a subsequent cycle of operation of said sender, means controlled by the presence of accumulated trunk lines for initiating operation of said sender, and means in each selector for returning stop dial supervision to its controlling operator position until said impulses have been transmitted over its selected trunk line.

11. In a telephone system, a plurality of trunk selectors having access to a group of trunk lines, means for extending individual connections from calling lines of said system to said trunk selectors, means responsive to the extension of a connection to any one of said selectors for causing that selector to seize an idle trunk line, a sender operative through a given cycle to generate the impulses of one or more predetermined digits, first, second, and third conductors extending from said sender to said selectors in multiple, first, second, and third relays in each of said selectors, means in each selector responsive to the seizure of a trunk line for connecting said first relay to said first conductor, means in said sender responsive to the connection of one or more of said first relays to said first conductor for applying a pickup pulse to said first conductor for operating all of the first relays connected thereto, means in each selector responsive to the operation of said first relay for connecting said second relay to said second conductor and for connecting said third relay to said third conductor, means in said sender thereafter operative to apply said impulses to said second conductor, each of said second relays being operated on each impulse to repeat said impulse to the trunk line seized by that selector, means in said sender for applying operating potential to said third conductor at the end of said given cycle to thereby operate all of the third relays connected thereto, means in each selector responsive to the operation of said third relay for disconnecting said first and second relays from said first and second conductors, respectively, for the duration of the call, and means also responsive to the operation of said third relay for completing a connection between the calling line controlling that selector and the trunk line selected by that selector.

References Cited in the file of this patent

UNITED STATES PATENTS

| | | |
|---|---|---|
| 1,729,855 | Lubberger | Oct. 1, 1929 |
| 1,750,848 | Lubberger et al. | Mar. 18, 1930 |
| 1,752,500 | Munchenhagen | Apr. 1, 1930 |
| 1,855,727 | Ostline | Apr. 26, 1932 |